(12) United States Patent
Xiang

(10) Patent No.: US 9,167,853 B2
(45) Date of Patent: Oct. 27, 2015

(54) USB CHARGER FOR ELECTRONIC CIGARETTES

(71) Applicant: Zhiyong Xiang, Guangdong (CN)

(72) Inventor: Zhiyong Xiang, Guangdong (CN)

( * ) Notice: Subject to any disclaimer, the term of this patent is extended or adjusted under 35 U.S.C. 154(b) by 12 days.

(21) Appl. No.: 14/056,675

(22) Filed: Oct. 17, 2013

(65) Prior Publication Data

US 2015/0015186 A1    Jan. 15, 2015

(30) Foreign Application Priority Data

Jul. 11, 2013    (CN) .................... 2013 2 0414571 U

(51) Int. Cl.
A24F 47/00    (2006.01)

(52) U.S. Cl.
CPC .................... *A24F 47/008* (2013.01)

(58) Field of Classification Search
CPC .................................................. A24F 47/008
USPC ................. 320/107, 110, 137, 106, 128, 164
See application file for complete search history.

(56) References Cited

U.S. PATENT DOCUMENTS

| | | | |
|---|---|---|---|
| 6,861,824 B1 * | 3/2005 | Liu et al. ...................... | 320/164 |
| 7,528,574 B1 * | 5/2009 | Adkins et al. ................. | 320/128 |
| D704,629 S * | 5/2014 | Liu .............................. | D13/108 |
| 2007/0273327 A1 * | 11/2007 | Daniel et al. .................. | 320/110 |
| 2008/0111521 A1 * | 5/2008 | So et al. ........................ | 320/137 |
| 2009/0027003 A1 * | 1/2009 | Adelman et al. .............. | 320/106 |
| 2014/0053857 A1 * | 2/2014 | Liu .............................. | 131/329 |
| 2014/0184173 A1 * | 7/2014 | Szepesi ......................... | 320/164 |
| 2014/0196732 A1 * | 7/2014 | Liu .............................. | 131/329 |
| 2014/0285937 A1 * | 9/2014 | Xiang .......................... | 361/91.2 |

\* cited by examiner

*Primary Examiner* — Richard Isla Rodas
*Assistant Examiner* — Dung V Bui
(74) *Attorney, Agent, or Firm* — Tim Tingkang Xia, Esq.; Locke Lord LLP

(57) ABSTRACT

A USB charger for electronic cigarettes, comprising a USB interface configured for connecting with a power supply and a load end configured for connecting with a load, wherein, the USB charger for electronic cigarettes further comprises a voltage comparison unit, a benchmark circuit, a sampling circuit, a current detecting element, a state indicating unit, and a low voltage difference linear regulator connected between the USB interface and the load end; the benchmark circuit is connected between an output end of the low voltage difference linear regulator and an input end of the voltage comparison unit; and the state indicating unit is connected with an output end of the voltage comparison unit; the USB charger for electronic cigarettes of the present invention achieves advantages effects of being safer and improving users' experiences.

14 Claims, 3 Drawing Sheets

USB CHARGER FOR ELECTRONIC CIGARETTES

CROSS-REFERENCE TO RELATED APPLICATIONS

This non-provisional application claims priorities under 35 U.S.C. §119(a) on Patent Application No. 201320414571.0 filed in P.R. China on Jul. 11, 2013, the entire contents of which are hereby incorporated by reference.

FIELD OF THE INVENTION

The present invention relates to the field of electrical products, and more particularly, relates to a USB charger for electronic cigarettes.

BACKGROUND OF THE INVENTION

In most current USB chargers for electronic cigarettes, some ones are straight-through type chargers, wherein such a charger is only equivalent to an adapter (i.e., a USB interface switched into an interface matching battery rods of the electronic cigarettes); some ones only comprise comparators and state indicating units (e.g., state indicator lamps) for indicating charging states, and do not include low voltage difference linear regulators for over-temperature, over-current and short-circuit protection; and some ones only adopt low voltage difference linear regulator (LDO) control, but do not include comparators and state indicating units (e.g., state indicator lamps) for indicating charging states. In use, the above three kinds of USB chargers for electronic cigarettes may generate certain hidden dangers and bring bad experience effects to users.

SUMMARY OF THE INVENTION

The objective of the present invention is to provide an improved USB charger for electronic cigarettes, aiming at the above-mentioned drawbacks that the USB chargers for electronic cigarettes in the prior art may generate certain hidden dangers and bring bad experience effects to users.

The technical solutions of the present invention for solving the technical problems are as follows: a USB charger for electronic cigarettes, comprising a USB interface configured for connecting with a power supply and a load end configured for connecting with a load, the USB charger for electronic cigarettes further comprises a voltage comparison unit, a benchmark circuit, a sampling circuit, a current detecting element, a state indicating unit, and a low voltage difference linear regulator connected between the USB interface and the load end; the benchmark circuit is connected between an output end of the low voltage difference linear regulator and an input end of the voltage comparison unit; and the state indicating unit is connected with an output end of the voltage comparison unit;

the low voltage difference linear regulator receives power via the USB interface and charges the load, and is further configured to provide over-current protection, short-circuit protection, and over-temperature protection in real time in the charging process;

the current detecting element is configured for detecting the charging current, and forms a voltage thereon;

the sampling circuit is configured for acquiring a node voltage between the load end and the current detecting element, and generates a comparison voltage at the input end of the comparison unit according to the node voltage;

the benchmark circuit is configured to generate a benchmark voltage, and transmits the benchmark voltage to the voltage comparison unit;

the voltage comparison unit is configured to compare the comparison voltage with the benchmark voltage, determine a charging state of the USB charger for electronic cigarettes, and control the state indicating unit to indicate the charging state according to the charging state.

Advantageously, the state indicating unit comprises a first light emitting diode and a second light emitting diode, the voltage comparison unit comprises a first voltage comparator and a second voltage comparator, the first light emitting diode and the second light emitting diode are respectively connected with an output end of the first voltage comparator and an output end of the second voltage comparator;

the sampling circuit generates the comparison voltage at a positive input end of the first voltage comparator and a negative input end of the second voltage comparator respectively, and the benchmark circuit transmits the benchmark voltage to a negative input end of the first voltage comparator and a positive input end of the second voltage comparator respectively.

Advantageously, the current detecting element is a detecting resistor.

Advantageously, the detecting resistor is connected between a cathode of the load end and ground; the benchmark circuit comprises a first resistor and a second resistor, and the sampling circuit comprises a third resistor;

wherein, the first resistor and the second resistor are connected in series and then are connected between a fifth pin of the low voltage difference linear regulator and ground, and the negative input end of the first voltage comparator and the positive input end of the second voltage comparator are connected between the first resistor and the second resistor respectively; one end of the third resistor is connected between the detecting resistor and the cathode of the load end, and the other end of the third resistor is connected with the positive input end of the first voltage comparator and the negative input end of the second voltage comparator respectively;

a cathode of the first light emitting diode is connected with the output end of the first voltage comparator, an anode of the first light emitting diode is connected with an anode of the load end, a cathode of the second light emitting diode is connected with the output end of the second voltage comparator, and an anode of the second light emitting diode is connected with the anode of the load end.

Advantageously, the USB charger for electronic cigarettes further comprises a first filter capacitor, one end of the first filter capacitor is connected between the voltage comparison unit and the third resistor, and the other end of the first filter capacitor is connected with the ground.

Advantageously, the detecting resistor is connected between the fifth pin of the low voltage difference linear regulator and the anode of the load end; the benchmark circuit comprises a first resistor and a second resistor, and the sampling circuit comprises a fourth resistor, a fifth resistor and a regulating resistor;

the first resistor and the second resistor are connected in series and then are connected between the fifth pin of the low voltage difference linear regulator and the ground, the negative input end of the first voltage comparator and the positive input end of the second voltage comparator are respectively connected between the first resistor and the second resistor; the fourth resistor, the fifth resistor and the regulating resistor are connected in series, and then one end of the regulating resistor is connected with the ground, and one end of the fourth resistor is connected between the detecting resistor and the anode of the load end; an anode of the first voltage comparator and a cathode of the second comparator are connected between the fourth resistor and the fifth resistor respectively;

the anode of the first light emitting diode is connected with the output end of the first voltage comparator, the cathode of the first light emitting diode is connected with the ground, the anode of the second light emitting diode is connected with the output end of the second voltage comparator, and the cathode of the light emitting diode is connected with the ground.

Advantageously, the USB charger for electronic cigarettes further comprises a first pull-up resistor and a second pull-up resistor, the first pull-up resistor is connected between the output end of the first voltage comparator and the fifth pin of the low voltage linear voltage regulator, and the second pull-up resistor is connected between the output end of the second voltage comparator and the fifth pin of the low voltage linear voltage regulator.

Advantageously, the fifth pin of the low voltage difference linear regulator is connected with the ground via a sixth resistor and a seventh resistor connected in series, and the fourth pin of the low voltage difference linear regulator is connected between the sixth resistor and the seventh resistor.

Advantageously, the USB charger for electronic cigarettes further comprises a second filter capacitor, one end of the second filter capacitor is connected with the fifth pin of the low voltage difference linear regulator, and the other end of the second filter capacitor is connected with the ground.

Advantageously, the USB charger for electronic cigarettes comprises a third filter capacitors, one end of the third filter capacitor is connected with the first pin) of the low voltage difference linear regulator, the other end of the third filtering capacitor and is connected with the ground.

Advantageously, a first protective resistor is connected between the first light emitting diode and the output end the first voltage comparator; and a second protective resistor is connected between the second light emitting diode and the output end of the second voltage comparator.

Advantageously, an over-temperature protection unit, a short-circuit protection unit, and an over-current protection unit are mounted inside the low voltage difference linear regulator; the over-temperature protection unit, the short-circuit protection unit, and the over-current protection unit are connected in series, and then are disposed in an internal circuit connected between the first pin and the fifth pin; when the charging current is more than a preset charging current value of the over-current protection, the over-current protection unit cuts off, and the fifth pin stops outputting a charging voltage; when an internal temperature in the low voltage difference linear regulator exceeds a preset temperature value, the over-temperature protection unit cuts off, and the fifth pin stops outputting the charging voltage; and when the load end is short-circuited, the short-circuit protection unit detects that the charging current instantaneously increases and cuts off, and the fifth pin stops outputting the charging voltage.

When implementing the present invention, the following advantageous effects can be achieved: the present invention provides a USB charger for electronic cigarettes, which comprises both a charging state indicating unit for indication a charging state and a low voltage difference linear regulator, has all the functions of charging state indication, over-temperature protection, over-current protection, and short-circuit protection, and achieves advantages effects of being safer and improving users' experiences.

BRIEF DESCRIPTION OF THE DRAWINGS

The present invention will be further described with reference to the accompanying drawings and embodiments in the following, in the accompanying drawings.

DETAILED DESCRIPTION OF THE PREFERRED EMBODIMENT

Figure 1:
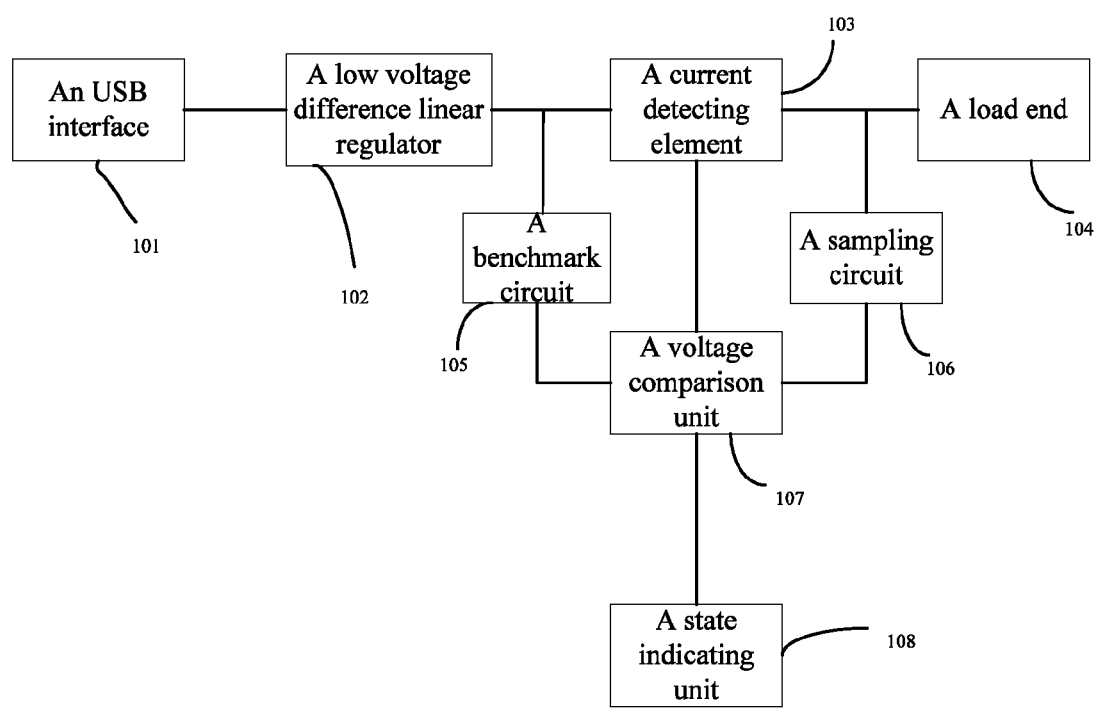
FIG. 1 is a principle block diagram of an USB charger for electronic cigarettes of the present invention.

FIG. 1 shows a USB charger for electronic cigarettes, which comprises a USB interface 101, a low voltage difference linear regulator (LDO) 102, a current detecting element 103, a load end 104, a benchmark circuit 105, a sampling circuit 106, a voltage comparison unit 107, and a state indicating unit 108.

The USB interface 101, the low voltage difference linear regulator 102, the current detecting element 103, and the load end 104 are electrically connected in series. The benchmark circuit 105 is connected between a voltage output end of the low voltage difference linear regulator 102 and an input end of the voltage comparison unit 107. One end of the sampling circuit 106 is connected with the input end of the voltage comparison unit 107, and the other end of the sampling circuit 106 is connected between the current detecting element 103 and the load end 104. The state indicating unit 108 is connected with the output end of the voltage comparison unit 107.

The low voltage difference linear regulator 102 gets power supply, over-current protection, short-circuit protection, and over-temperature protection via the USB interface 101. The current detecting element 103 is configured for detecting the charging current and forming a voltage thereon, correspondingly. The sampling circuit 106 is configured for sampling a node voltage between the load end 104 and the current detecting element 103, and generates a voltage at the input end of the voltage comparison unit 107 according to the node voltage. The benchmark circuit 105 is configured to generate a benchmark voltage, and transmits the benchmark voltage to the voltage comparison unit 107. The voltage comparison unit 107 is configured to compare the comparison voltage with the benchmark voltage, determine a charging state of the USB charger for electronic cigarettes according to the comparison result, and control the state indicating unit 108 to light according to the charging state. A voltage of the load end 104 can be judged according to the charging state, and then a voltage of the current detecting element 103 can be calculated. The charging current at this time can be obtained by dividing a voltage value of the current detecting unit 103 by a resistance value of the current detecting unit 103.

A signal flow of this embodiment is described as follows: the low voltage difference linear regulator 102 gets power supply via the USB interface 101, and the voltage output end of the low voltage difference linear regulator 102 outputs a voltage V. The benchmark circuit 105 obtains a constant voltage from the voltage output end, the constant voltage is adjusted by the benchmark circuit 105, and a benchmark voltage V0 is generated and output to the input end of the voltage comparing unit 107. At the same time, when charging current flows through the current detecting element 103, a partial voltage V1 is generated at the current detecting element 103. The sampling circuit 106 is connected between the load end 104 and the current detecting element 103 to sample a node voltage V2 here, and generates a comparison voltage Vp at the input end of the voltage comparing unit 107 according to the node voltage V2. The voltage comparison unit 107 compares V0 with Vp to judge a charging state, and drives the state indicating unit 108 connected with the voltage comparison unit 107 to light, thereby indicating the charging state.

Figure 2:
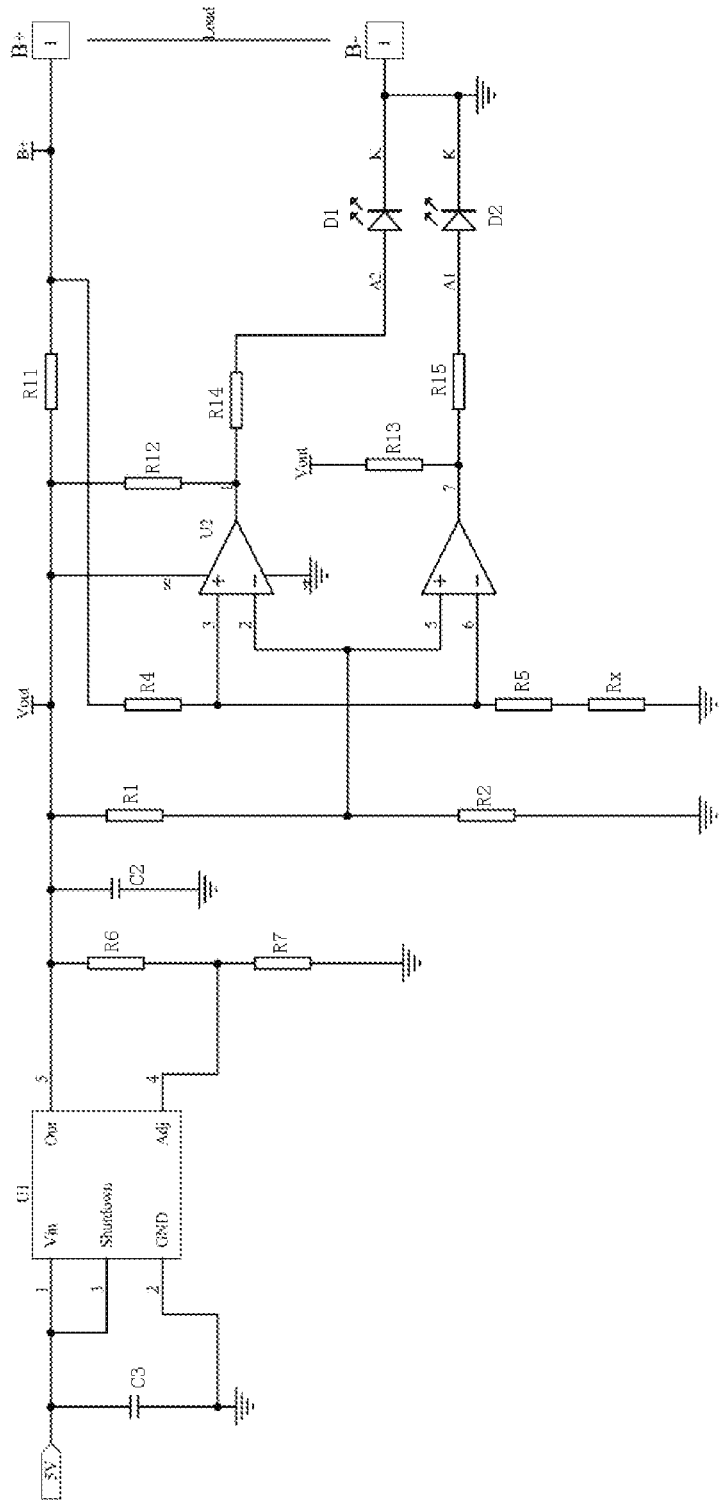
FIG. 2 is a circuit diagram of an USB charger for electronic cigarettes of one embodiment of the present invention.

Referring to FIG. 2, in this embodiment, the current detecting element 103 is connected between an anode of the load end 104 and the voltage output end of the low voltage difference linear regulator 102. The voltage output end of the low voltage difference linear regulator 102 is a fifth pin Out. A chip U1 of the low voltage difference linear regulator 102 is in a type of AP2127K-ADJ. The current detecting element 103 is a detecting resistor R11. The benchmark circuit 105 comprises a first resistor R1 and a second resistor R2. The sampling circuit 106 comprises a fourth resistor R4, a fifth resistor R5, and an adjusting resistor Rx. The voltage comparison unit 107 is a dual voltage comparator U2, which comprises a first voltage comparator and a voltage second comparator. Two filter capacitors, which are a second filtering capacitor C2 and a third filtering capacitor C3 respectively, are provided. Two protective resistors, which are a first protective resistor R14 and a second protective resistor R15 respectively, are provided. Two pull-up resistors, which are a first pull-up resistor R12 and a second pull-up resistor R13, are provided. The state indicating unit 108 includes a first light emitting diode D1 and a second light emitting diode D2. The first light emitting diode D1 sends out green light, and the second light emitting diode D2 sends out red light.

Circuit connection relations of this embodiment are described as follows: a first pin Vin and a third pin shutdown of the low voltage difference linear regulator 102 get a 5V voltage via the USB interface 101; a second pin GND is grounded; the fifth pin Out acts as the voltage output end, and the fifth pin Out is connected with the ground via a sixth resistor R6 and a seventh R7 connected in series; and a fourth pin Adj is connected between the sixth resistor R6 and the seventh resistor R7. One end of the second filter capacitor C2 is connected to the fifth pin Out, and the other end of the second filter capacitor C2 is grounded. One end of the third filter capacitor C3 is connected with the first pin Vin, and the other end of the third filter capacitor C3 is grounded. The first resistor R1 and the second resistor R2 are connected in series, one end of the first resistor R1 is connected with the fifth pin Out, and one end of the second resistor R2 is grounded. Both a negative input end of the first voltage comparator and a positive input end of the second voltage comparator are connected between the first resistor R1 and the second resistor R2. The detection resistor R11 is connected between the fifth pin Out and the anode of the load end 104. The fourth resistor R4, the fifth resistor R5, and the adjusting resistor Rx are connected in series, one end of the adjusting resistor Rx is grounded, and one end of the fourth resistor R4 is connected between the detection resistor R11 and the anode of the load end 104. Both a positive input end of the first voltage comparator and a negative input end of the second voltage comparator are connected between the fourth resistors R4 and the fifth resistor R5. An anode of the first light emitting diode D1 is connected with the output end of the first voltage comparator, and a cathode of the first light emitting diode D1 is grounded. An anode of second light-emitting oxide D2 is connected with the output end of the second voltage comparator, and a cathode of the second light emitting diode D2 is grounded. One end of the first pull-up resistor R12 is connected with the fifth pin Out, and the other end of the first pull-up resistor R12 is connected with the output end of the first voltage comparator. One end of the second pull-up resistor R13 is connected with the fifth pin Out, and the other end of the second pull-up resistor R13 is connected to the output end of the second voltage comparator. The first protective resistor R14 is connected between the output end of the first voltage comparator and the first light-emitting diode D1. The second protective resistor R15 is connected between the output end of second voltage comparator and the second light-emitting diode D2.

The sampling circuit 106 samples the node voltage V2 between the current detecting element 103 and the load end 104, and generates a comparison voltage Vp at the voltage comparison unit 107. If Vp is more than the value of V0, it is illustrated the charging process is finished. Thus, the first voltage comparator outputs an high electrical level, and the second voltage comparator outputs an low electrical level. At this time, the first light-emitting diode D1 lights, and the second light emitting diode D2 does not light. If Vp is less than the value of V0, it is illustrated the charging process is continuing. Thus, the first voltage comparator outputs the low electrical level, and the second comparator outputs the high electrical level. At this time, the first light-emitting diode D1 does not light, and the second light emitting diode D2 lights.

In this embodiment, the first light-emitting diode D1 and the second light emitting diode D1 are driven by the high electrical level respectively. Therefore, in order to ensure the output voltages of the first voltage comparator and the second comparator to be high enough to make the first light-emitting diode D1 and the second light emitting diode D2 light, the first pull-up resistor R12 and the second pull-up resistor R13 are configured.

Figure 3:
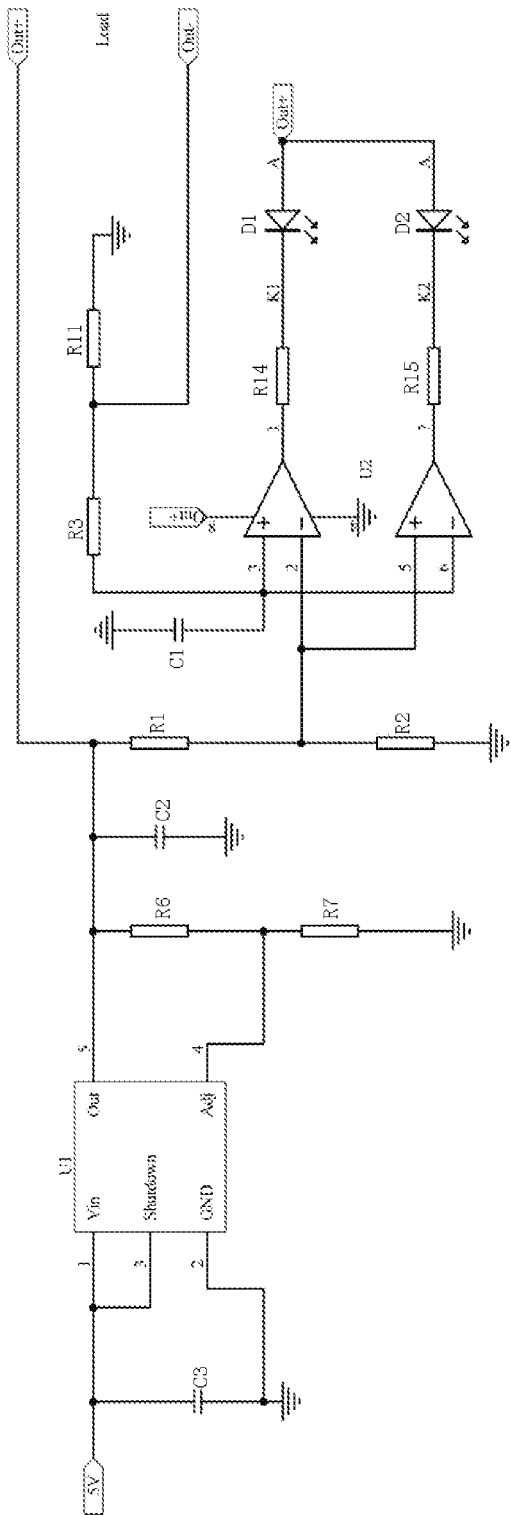
FIG. 3 is a circuit diagram of an USB charger for electronic cigarettes of another embodiment of the present invention.

Referring to FIG. 3, in this embodiment, the current detecting element 103 is connected between a cathode of the load end 104 and the ground. A chip of the low voltage difference linear regulator 102 is in a type of AP2127K-ADJ. The current detecting element 103 is a detecting resistor R11. The benchmark circuit 105 comprises a first resistor R1 and a second resistor R2. The sampling circuit 106 comprises a third resistor R3. The voltage comparison unit 107 is a dual voltage comparator, which comprises a first voltage comparator and a second voltage comparator. Three filter capacitors, which are a first filtering capacitor C1, a second filtering capacitor C2 and a third filtering capacitor C3 respectively, are provided. Two protective resistors, which are a first protective resistor R14 and a second protective resistor R15 respectively, are provided. The state indicating unit 108 comprises a first light emitting diode D1 and a second light emitting diode D2. The first light emitting diode D1 sends out green light, and the second light emitting diode D2 sends out red light.

Circuit connections of this embodiment are described as follows: a first pin Vin and a third pin shutdown of the low voltage difference linear regulator 102 get a 5V voltage via the USB interface 101; a second pin GND is grounded; a fifth pin Out acts as the voltage output end, and the fifth pin Out is connected with the ground via a sixth resistor R6 and a seventh R7 connected in series; and a fourth pin Adj is connected between the sixth resistors R6 and the R7 seventh resistor. One end of the second filter capacitor C2 is connected to the fifth pin Out, and the other end of the second filter capacitor C2 is grounded. One end of the third filter capacitor C3 is connected with the first pin Vin, and the other end of the third filter capacitor C3 is grounded. The first resistor R1 and the second resistor R2 are connected in series, and one end of the second resistor R2 is ground. Both a negative input end of the first voltage comparator and a positive input end of the second voltage comparator are connected between the first resistor R1 and the second resistor R2. One end of a third resistor R3 is connected between the detection resistor R11 and a cathode of the load end 104, and the other end of the third resistor R3 is connected with a positive input end of the first voltage comparator and a negative input end of the second voltage comparator respectively. One end of the first filter capacitor C1 is grounded, and the other end of the first filter capacitor C1 is connected between the positive input end of the first voltage comparator and the third resistor R3. A cathode of the first light emitting diode D1 is connected with the output end of the first voltage comparator, and an anode of the first light emitting diode D1 is connected with the anode of the load end. A cathode of second light-emitting diode D2 is connected with the output end of the second voltage comparator, and an anode of the second light emitting diode D2 is connected with the anode of the load end. The first protective resistor R14 is connected between the first light-emitting diode D1 and the output end of the first voltage comparator. The second protective resistor R15 is connected with the second light-emitting diode D2 and the output end of second voltage comparator.

When an electronic cigarette charged by the USB charger for electronic cigarettes is not fully charged, a voltage of the load end 104 is Va, and a voltage of the voltage detecting element 103 is Vc. When the electronic cigarette is fully charged, the voltage of the load end 104 is Vb, and the voltage of the current detecting element 103 is Vd; wherein, Va<Vb. The sampling circuit 106 generates a real-time voltage Vp at the output end of the voltage comparison unit 107. In this embodiment, Vp, the node voltage V2, and the voltage on the current detecting element 103 are equal to each other. When the electronic cigarette is fully charged, Vp=Vc=V−Vb; and when the electronic cigarette is not fully charged, the voltage on the current detecting element 103 is Vp=Vd=V−Va. The benchmark voltage is V0=V*R2/(R1+R2). At this time, because Va<Vb, so Vd>Vc. A value between Vc and Vd is selected and used as the benchmark voltage V0. When Vp>V0, the charging process is finished. The first voltage comparator outputs the high electrical level, and the second voltage comparator outputs low electrical level. Thus, the first light-emitting diode D1 does not light, and the second light emitting diode D2 lights. When Vp<V0, the charging process is not finished. The first voltage comparator outputs the low electrical level, and the second comparator outputs the high electrical level. Thus, the first light-emitting diode D1 lights, and the second light emitting diode D2 does not light.

The low voltage difference linear regulator 102 of the aforementioned two embodiments is described in detail as follows. The low voltage difference linear regulator 102 has over-current protection, short-circuit protection, and over-temperature protection function. An over-temperature protection unit, a short-circuit protection unit, and a over-current protection unit are mounted inside the low voltage difference linear regulator. The over-temperature protection unit, the short-circuit protection unit, and the over-current protection unit are connected in series, and then are connected with the internal circuit between the first pin and the fifth pin. When the charging current is more than preset charging current, the over-current protection unit cuts down, and the fifth pin stops outputting voltage. When an internal temperature of the low voltage difference linear regulator exceeds a preset value, the over-temperature protection unit cuts down, and the fifth pin stops outputting electrical levels. When the load end is short-circuited, the short-circuit protection unit detects that the charging current instantaneously increases and cuts off, and the fifth pin stops outputting the charging voltage.

Understandably, the ordinary technicians in the field can make improvements and modifications according to the above description, all these improvements and modifications belong to the protection of the present invention.

What is claimed is:

1. A USB charger for electronic cigarettes, comprising a USB interface configured for connecting with a power supply and a load end configured for connecting with a load, wherein, the USB charger for electronic cigarettes further comprises a voltage comparison unit, a benchmark circuit, a sampling circuit, a current detecting element, a state indicating unit, and a low voltage difference linear regulator connected between the USB interface and the load end; the benchmark circuit is connected between an output end of the low voltage difference linear regulator and an input end of the voltage comparison unit; and the state indicating unit is connected with an output end of the voltage comparison unit;
   wherein, the state indicating unit comprises a first light emitting diode and a second light emitting diode, the voltage comparison unit comprises a first voltage comparator and a second voltage comparator, the first light emitting diode and the second light emitting diode are respectively connected with an output end of the first voltage comparator and an output end of the second voltage comparator;
   wherein, the sampling circuit generates a comparison voltage at a positive input end of the first voltage comparator and a negative input end of the second voltage comparator respectively, and the benchmark circuit transmits a benchmark voltage to a negative input end of the first voltage comparator and a positive input end of the second voltage comparator respectively;
   wherein, the current detecting element is a detecting resistor, and the detecting resistor is connected between a cathode of the load end and ground; the benchmark circuit comprises a first resistor and a second resistor, and the sampling circuit comprises a third resistor;
   wherein, the first resistor and the second resistor are connected in series and then are connected between a fifth pin of the low voltage difference linear regulator and ground, and the negative input end of the first voltage comparator and the positive input end of the second voltage comparator are connected between the first resistor and the second resistor respectively; one end of the third resistor is connected between the detecting resistor and the cathode of the load end, and the other end of the third resistor is connected with the positive input end of the first voltage comparator and the negative input end of the second voltage comparator respectively;
   wherein, a cathode of the first light emitting diode is connected with the output end of the first voltage comparator, an anode of the first light emitting diode is connected with an anode of the load end, a cathode of the second light emitting diode is connected with the output end of the second voltage comparator, and an anode of the second light emitting diode is connected with the anode of the load end;
   wherein, the low voltage difference linear regulator receives power via the USB interface and charges the load, and is further configured to provide over-current protection, short-circuit protection, and over-temperature protection in real time in the charging process;
   the current detecting element is configured for detecting the charging current, and forms a voltage thereon;
   the sampling circuit is configured for acquiring a node voltage between the load end and the current detecting element, and generates the comparison voltage at the input end of the comparison unit according to the node voltage;

the benchmark circuit is configured to generate the benchmark voltage, and transmits the benchmark voltage to the voltage comparison unit;

the voltage comparison unit is configured to compare the comparison voltage with the benchmark voltage, determine a charging state of the USB charger for electronic cigarettes, and control the state indicating unit to indicate the charging state according to the charging state.

2. The USB charger for electronic cigarettes according to the claim 1, wherein, the USB charger for electronic cigarettes further comprises a first filter capacitor, one end of the first filter capacitor is connected between the voltage comparison unit and the third resistor, and the other end of the first filter capacitor is connected with the ground.

3. The USB charger for electronic cigarettes according to the claim 1, wherein, the fifth pin of the low voltage difference linear regulator is connected with the ground via a sixth resistor and a seventh resistor connected in series, and a fourth pin of the low voltage difference linear regulator is connected between the sixth resistor and the seventh resistor.

4. The USB charger for electronic cigarettes according to the claim 3, wherein, the USB charger for electronic cigarettes further comprises a second filter capacitor, one end of the second filter capacitor is connected with the fifth pin of the low voltage difference linear regulator, and the other end of the second filter capacitor is connected with the ground.

5. The USB charger for electronic cigarettes according to the claim 4, wherein, the USB charger for electronic cigarettes further comprises a third filter capacitors, one end of the third filter capacitor is connected with a first pin of the low voltage difference linear regulator, and the other end of the third filtering capacitor and is connected with the ground.

6. The USB charger for electronic cigarettes according to the claim 5, wherein, a first protective resistor is connected between the first light emitting diode and the output end the first voltage comparator; and a second protective resistor is connected between the second light emitting diode and the output end of the second voltage comparator.

7. The USB charger for electronic cigarettes according to the claim 1, wherein, an over-temperature protection unit, a short-circuit protection unit, and an over-current protection unit are mounted inside the low voltage difference linear regulator; the over-temperature protection unit, the short-circuit protection unit, and the over-current protection unit are connected in series, and then are disposed in an internal circuit connected between a first pin and the fifth pin; when the charging current is more than a preset charging current value of the over-current protection, the over-current protection unit cuts off, and the fifth pin stops outputting a charging voltage; when an internal temperature in the low voltage difference linear regulator exceeds a preset temperature value, the over-temperature protection unit cuts off, and the fifth pin stops outputting the charging voltage; and when the load end is short-circuited, the short-circuit protection unit detects that the charging current instantaneously increases and cuts off, and the fifth pin stops outputting the charging voltage.

8. A USB charger for electronic cigarettes, comprising a USB interface configured for connecting with a power supply and a load end configured for connecting with a load, wherein, the USB charger for electronic cigarettes further comprises a voltage comparison unit, a benchmark circuit, a sampling circuit, a current detecting element, a state indicating unit, and a low voltage difference linear regulator connected between the USB interface and the load end; the benchmark circuit is connected between an output end of the low voltage difference linear regulator and an input end of the voltage comparison unit; and the state indicating unit is connected with an output end of the voltage comparison unit;

wherein, the state indicating unit comprises a first light emitting diode and a second light emitting diode, the voltage comparison unit comprises a first voltage comparator and a second voltage comparator, the first light emitting diode and the second light emitting diode are respectively connected with an output end of the first voltage comparator and an output end of the second voltage comparator;

wherein, the sampling circuit generates a comparison voltage at a positive input end of the first voltage comparator and a negative input end of the second voltage comparator respectively, and the benchmark circuit transmits a benchmark voltage to a negative input end of the first voltage comparator and a positive input end of the second voltage comparator respectively;

wherein, the current detecting element is a detecting resistor, and the detecting resistor is connected between a fifth pin of the low voltage difference linear regulator and an anode of the load end; the benchmark circuit comprises a first resistor and a second resistor, and the sampling circuit comprises a fourth resistor, a fifth resistor and a regulating resistor;

wherein, the first resistor and the second resistor are connected in series and then are connected between the fifth pin of the low voltage difference linear regulator and the ground, the negative input end of the first voltage comparator and the positive input end of the second voltage comparator are respectively connected between the first resistor and the second resistor; the fourth resistor, the fifth resistor and the regulating resistor are connected in series, and then one end of the regulating resistor is connected with the ground, and one end of the fourth resistor is connected between the detecting resistor and the anode of the load end; an anode of the first voltage comparator and a cathode of the second comparator are connected between the fourth resistor and the fifth resistor respectively;

wherein, an anode of the first light emitting diode is connected with the output end of the first voltage comparator, a cathode of the first light emitting diode is connected with the ground, an anode of the second light emitting diode is connected with the output end of the second voltage comparator, and a cathode of the second light emitting diode is connected with the ground;

wherein, the low voltage difference linear regulator receives power via the USB interface and charges the load, and is further configured to provide over-current protection, short-circuit protection, and over-temperature protection in real time in the charging process;

the current detecting element is configured for detecting the charging current, and forms a voltage thereon;

the sampling circuit is configured for acquiring a node voltage between the load end and the current detecting element, and generates the comparison voltage at the input end of the comparison unit according to the node voltage;

the benchmark circuit is configured to generate the benchmark voltage, and transmits the benchmark voltage to the voltage comparison unit;

the voltage comparison unit is configured to compare the comparison voltage with the benchmark voltage, determine a charging state of the USB charger for electronic cigarettes, and control the state indicating unit to indicate the charging state according to the charging state.

9. The USB charger for electronic cigarettes according to the claim 8, wherein, the USB charger for electronic cigarettes further comprises a first pull-up resistor and a second pull-up resistor, the first pull-up resistor is connected between the output end of the first voltage comparator and the fifth pin of the low voltage linear voltage regulator, and the second pull-up resistor is connected between the output end of the second voltage comparator and the fifth pin of the low voltage linear voltage regulator.

10. The USB charger for electronic cigarettes according to the claim 8, wherein, the fifth pin of the low voltage difference linear regulator is connected with the ground via a sixth resistor and a seventh resistor connected in series, and a fourth pin of the low voltage difference linear regulator is connected between the sixth resistor and the seventh resistor.

11. The USB charger for electronic cigarettes according to the claim 10, wherein, the USB charger for electronic cigarettes further comprises a second filter capacitor, one end of the second filter capacitor is connected with the fifth pin of the low voltage difference linear regulator, and the other end of the second filter capacitor is connected with the ground.

12. The USB charger for electronic cigarettes according to the claim 11, wherein, the USB charger for electronic cigarettes further comprises a third filter capacitors, one end of the third filter capacitor is connected with a first pin of the low voltage difference linear regulator, and the other end of the third filtering capacitor and is connected with the ground.

13. The USB charger for electronic cigarettes according to the claim 12, wherein, a first protective resistor is connected between the first light emitting diode and the output end the first voltage comparator; and a second protective resistor is connected between the second light emitting diode and the output end of the second voltage comparator.

14. The USB charger for electronic cigarettes according to the claim 8, wherein, an over-temperature protection unit, a short-circuit protection unit, and an over-current protection unit are mounted inside the low voltage difference linear regulator; the over-temperature protection unit, the short-circuit protection unit, and the over-current protection unit are connected in series, and then are disposed in an internal circuit connected between a first pin and the fifth pin; when the charging current is more than a preset charging current value of the over-current protection, the over-current protection unit cuts off, and the fifth pin stops outputting a charging voltage; when an internal temperature in the low voltage difference linear regulator exceeds a preset temperature value, the over-temperature protection unit cuts off, and the fifth pin stops outputting the charging voltage; and when the load end is short-circuited, the short-circuit protection unit detects that the charging current instantaneously increases and cuts off, and the fifth pin stops outputting the charging voltage.

* * * * *